April 11, 1967     H. SCHLITT     3,313,419
APPARATUS FOR USE IN WASH-THROUGH CHROMATOGRAPHY
Filed Nov. 4, 1963
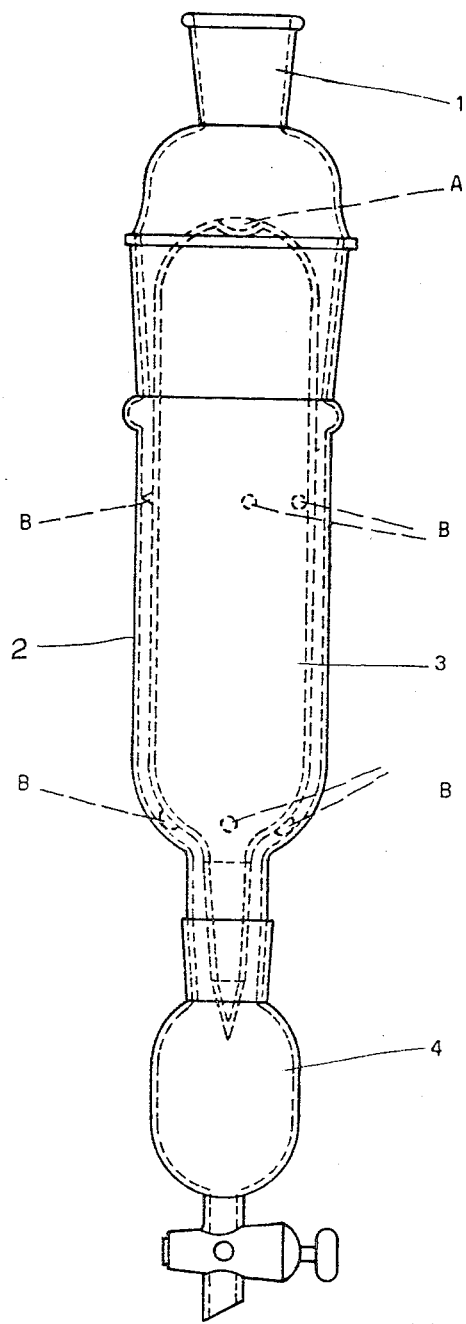
INVENTOR
Helmut SCHLITT
ATTORNEYS

3,313,419
APPARATUS FOR USE IN WASH-THROUGH CHROMATOGRAPHY
Helmut Schlitt, Masnago, Italy, assignor to European Atomic Energy Community—Euratom, Brussels, Belgium
Filed Nov. 4, 1963, Ser. No. 321,266
Claims priority, application Germany, Nov. 23, 1962, E 17,474
3 Claims. (Cl. 210—198)

This invention relates to a laboratory apparatus for analytical and preparatory separation of mixtures of chemical compounds, such as polyphenyl mixtures, in such a manner that the advantages of the separation by washing through the chromatographic column are combined with those of the high separation sharpness of the thin-layer chromatogram.

The novel apparatus is characterized by a rigid adsorption layer carrier extending in the washing direction and haivng a curved, closed surface. According to the preferred embodiment of the invention the adsorption layer carrier is cylindrical with arcuate top surface for dropping on the eluent and pointed discharge surface. The adsorption layer carrier is loosely fitted in a throughfeed vessel of a suitable form with an intermediate space being left between said carrier and said vessel.

The appended drawing is a schematic longitudinal section view of the preferred embodiment of the novel apparatus.

The essential part of the apparatus according to the instant invention is the cylindrical adsorption layer carrier 3, which is rounded up at the top and has there, in the middle, a small cavity A. At the bottom, it tapers cylindrically to form a dripping point. The carrier 3 is provided towards the bottom and the middle thereof, in each case, with two or three glass projections B of about 3 mm. in length which are used as spacers. The absorbent is applied onto the surface of the carrier 3 by means of a spraying process.

The carrier 3 is loosely fitted in the cylindrical throughfeed vessel 2. The latter is coupled at its bottom, through a ground stopper-like connection, to the receiving vessel from which the fractions can be removed by means of a stop-cock.

At its top, the vessel 2 is joined, through the provided ground reducing part 1, to a known dropping funnel (not shown in the drawing) which independently of its fullness guarantees uniform dripping velocity.

Operational example:

Into the cavity A of the upper surface of carrier 3 there is charged the mixture to be separated. The eluent is dropped through the above mentioned dropping funnel onto the same place; the chromatogram develops along the curved surface of the carrier and is washed through into the receiving vessel 4 in the classical manner.

The apparatus may consist, for instance, of glass, but it can also be made from other materials such as metal or plastic.

It will, of course, be understood that the invention is not limited to the specific preferential embodiment illustrated in the appended drawing, but that different modifications evident to those skilled in the art may be applied without departing from the spirit of the invention as defined in the following claims.

I claim:
1. Apparatus for use in wash-through thin-layer chromatography comprising: a cylindrical throughfeed vessel having an inlet and an outlet; a rigid carrier having a surface in the form of an upright cylinder with a domed upper end, said carrier being loosely fitted in said cylindrical throughfeed vessel with an intermediate space being left between said vessel and said carrier; and a thin layer of adsorption material provided on said surface.

2. Apparatus according to claim 1, in which the carrier has a pointed lower discharge surface and means are provided thereunder for collecting liquid dropping therefrom.

3. Apparatus according to claim 1, in which the domed upper end of the carrier is provided with a cavity in the middle thereof for charging a mixture to be separated and the carrier is further provided on its surface with projections for obtaining said intermediate space.

References Cited by the Examiner
UNITED STATES PATENTS
3,067,132   12/1962   Gunew _____ 210—198 X SAMIH ZAHARNA, *Primary Examiner.*